Sept. 12, 1939.        H. R. TRAPHAGEN        2,172,485
PLANTER
Filed June 8, 1936
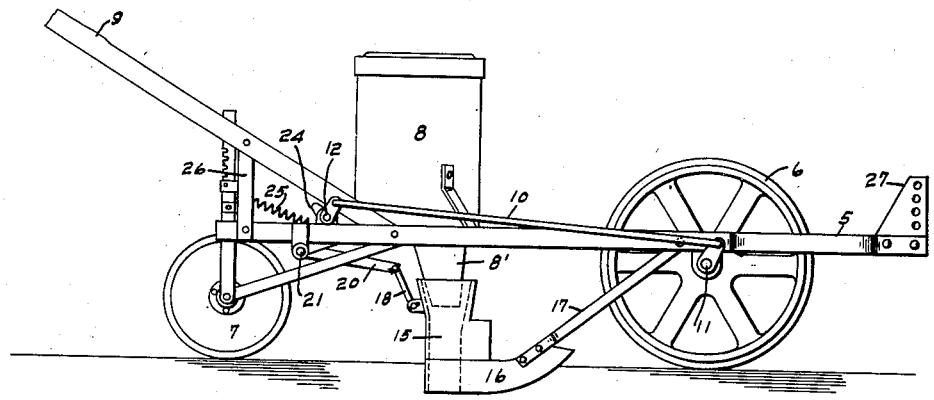
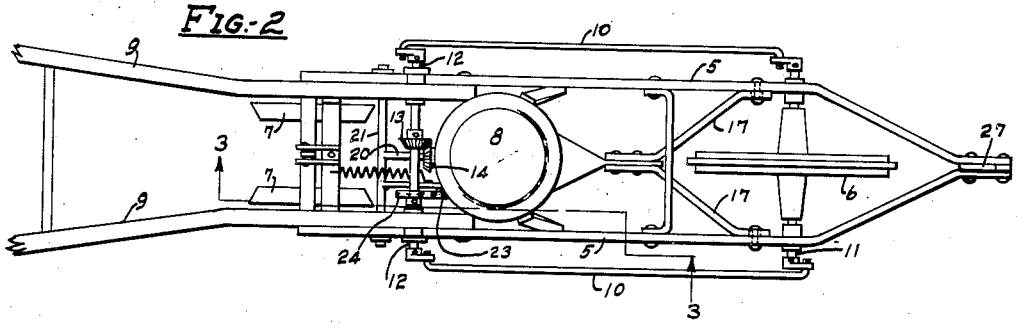
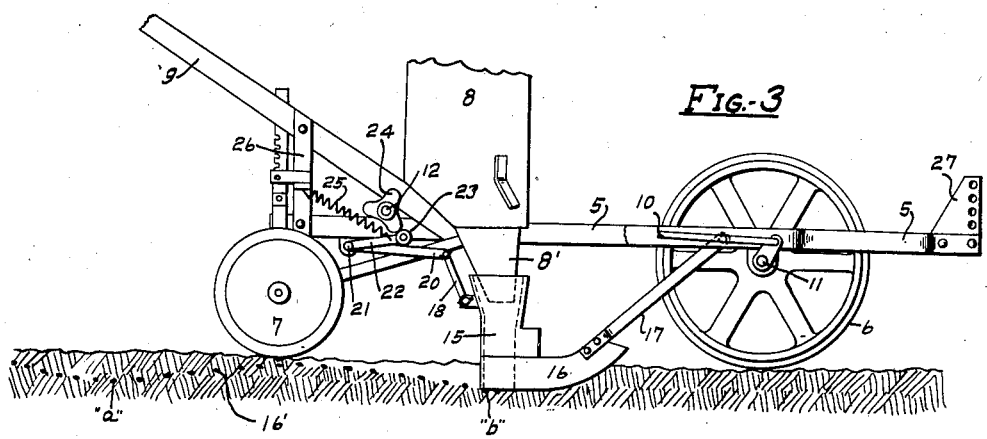
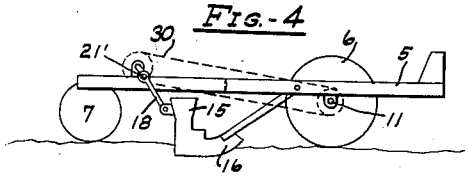
INVENTOR.
HARRY R. TRAPHAGEN
BY James A Walsh,
ATTORNEY Patented Sept. 12, 1939

2,172,485

UNITED STATES PATENT OFFICE 2,172,485

PLANTER

Harry R. Traphagen, Rockford, Ill., assignor to J. I. Case Company, Racine, Wis., a corporation Application June 8, 1936, Serial No. 84,056

8 Claims. (Cl. 111—14)

My invention relates to planters of the walking type, especially adapted for planting at variable depths to insure a crop in either wet or dry weather conditions, whereby replanting is eliminated, as well as chopping a crop, as cotton, when seed is sown at such depth as to rot in wet conditions, while seed planted at more shallow depth under such conditions will grow, and also whereby in dry seasons growth of seed planted at greater depth, and which therefore will be in moist soil, is assured, despite the lack of growth of the shallow planted seed at less depth in portions of the soil which become dry, as will hereinafter more fully appear.

In the accompanying drawing, forming part hereof, Figure 1 is a side elevation of a planter embodying my improvements; Fig. 2, a plan view; Fig. 3, a side elevation indicating the variable line of travel of the furrow runner as actuated by the adjusting mechanism which I employ, taken on the dotted lines 3—3 of Fig. 2, and Fig. 4 is a diagrammatic view of a modified form of the improvement.

In general, the planter is of conventional construction embodying a frame 5, draft wheel 6, press wheels 7, seed-box 8 equipped with interior seed droppers (not shown) of any appropriate character, handles 9, pitmans 10 connected to the drive wheel axle 11 and shaft 12, the latter being provided with a gear 13 engaging a gear 14 for actuating the seed dropping mechanisms in seed-box 8 which is provided with an outlet 8' for conveying seed into the chute 15 of the furrow opener 16.

The furrow runner or opener 16 is pivotally connected to the frame members 5 preferably by diverging braces 17, and its chute 15 is positioned in telescoping relation to the seed-box outlet 8', which chute is connected by a link 18 to an arm 20 fixedly secured to a rock-shaft 21 adjacent shaft 12 and supported by frame members 5, 5. Also fixedly secured to rock-shaft 21 is a cam-arm 22 which extends forwardly and is preferably equipped with a roller 23 adapted to be contacted by a cam 24 mounted upon and rotating with shaft 12, said cam being of a pronged or other character which in its rotation will constantly engage the cam-arm 22 which is held against the cam during its variable movements by means of a tension spring 25 connecting it to a part of the planter, as the standard 26.

In operation, the planter is generally drawn through the field by animal power attached to the hitch 27, causing the axle 11 to rotate, and, through the pitmans 10, to rotate the shaft 12 and the gears 13, 14, to actuate the seed dropping mechanism in seed-box 8, from which latter the seed flows through outlet 8' into chute 15 and thence to the opened furrow. As indicated, it is desirable to sow the seed at variable depths for the reasons hereinbefore stated, and this is accomplished by the action of the cam 24 upon cam-arm 22, which intermittently depresses the latter, and as said cam-arm is fixedly secured to rock-shaft 21, as also the arm 20, similar motion is imparted to the latter, so that by its connection 18 with chute 15 said chute will telescope upon outlet 8' and thus alternately raise and lower runner 16, with the result that the bottom of the opened furrow will be of undulating formation substantially as indicated by the dotted lines 16' in Fig. 3, and when the furrow is covered by the press wheels 7 the seed will be deposited in the variable depths as shown. It will be understood, of course, that as a prong of the cam 24 positively depresses cam-arm 22 to force the furrow opener to its downward limit the latter is moved upwardly by arm 20 and the link connection 18 through tension of spring 25, the curve of the furrow bottom 16' assuming approximately the formation indicated between a and b, Fig. 3, during one-third revolution of the drive-wheel 6, in which period cam 24 and the mechanism which it controls causing runner 16 to gradually raise and lower to produce such formation.

In the modified form shown in Fig. 4 equivalent mechanism is disclosed for operating the chute 15 and runner 16, the link 18 connecting the chute to a crank-shaft 21' which may be driven by a sprocket system 30 from the axle 11 to actuate the link to intermittently raise and lower said chute and runner in a manner similar to that hereinbefore described.

I claim as my invention:

1. In an implement of the class described, having a frame, a furrow opener pivotally secured thereto, an axle on the frame, a traction wheel on the axle, a shaft having a cam thereon mounted on the frame, a rock-shaft on the frame having a cam-arm thereon contacting with the cam, an opener adjusting-arm mounted on the rock-shaft, means connecting the adjusting arm to the furrow opener, means connecting said axle and shaft for rotating the latter and the cam to actuate the cam-arm and adjusting-arm to vertically adjust the opener, and yielding means connected to the cam-arm for maintaining the latter against the cam.

2. In an implement of the class described including a frame, a seed-box mounted thereon, a furrow opener positioned in relation to the seed-box to receive seed therefrom, a brace connected to the opener and having divergent members pivotally connected to the frame, a drive-shaft on the frame having a cam thereon, a rock-shaft adjacent the said shaft having a cam-arm extending therefrom and contacting the cam, and means on the rock-shaft and connected to the opener for vertically adjusting the latter when the cam-arm is actuated by the cam.

3. In an implement of the class described, the combination of a frame, a seed-box on the frame, a furrow opener communicating with the seed-box, means pivotally connecting the opener to the frame whereby the opener may be vertically moved in relation to the seed-box and forced to varying depths beneath the surface of the ground, a shaft supported on the frame having a cam thereon, a rockingly mounted cam-arm actuated by the cam, an opener adjusting-arm rockingly mounted on the frame and connected with the cam-arm, an axle supported on the frame having a traction wheel thereon, and means connecting the axle and said shaft for rotating the latter and the cam said cam-arm being so disposed as to be positively forced by said cam in a direction to actuate said opener adjusting-arm to force the opener into the ground, and means for retracting the opener when permitted by said cam.

4. In an implement of the class described, a frame, a drive axle supported by the frame, a traction wheel on the axle, a vertically adjustable furrow opener connected to the frame, a rock-shaft supported on the frame, an adjusting-arm on the rock-shaft, a link connecting the opener and arm, a cam-arm on the rock-shaft, a cam on the frame contacting with the cam-arm, and means for actuating the cam from the drive axle to impart reciprocating motion to the cam-arm for vertically adjusting the opener through its connection with the adjusting-arm.

5. In an implement of the class described, the combination of a frame, a drive axle supported by the frame, a seed box on the frame, a furrow opener on the frame so mounted as to be capable of vertical movement relatively thereto and arranged to receive seed from the seed box, an auxiliary shaft on the frame having a cam thereon, means on the shaft for actuating the seed box, means connecting the drive axle and auxiliary shaft for actuating the latter and a rock shaft associated with the cam shaft and connected to the furrow opener for imparting vertical reciprocating motion to the latter upon rotation of the cam shaft.

6. In an implement of the class described, the combination of a frame, a drive axle supported by the frame, a seed dropping device on the frame, a furrow opener mounted on the frame in a manner so as to be capable of up-and-down movement relatively thereto, said furrow opener being disposed to receive seed from said dropping device, an auxiliary shaft mounted upon the frame, means connecting the drive axle to said shaft for driving the latter, means connecting the auxiliary shaft for actuating the seed dropping device, and a rock shaft arranged to be actuated by the auxiliary shaft and connected to the furrow opener for vertically reciprocating the furrow opener when the shaft is rotated.

7. In an implement of the class described, the combination of a frame, a drive axle supported by the frame, a furrow opener on the frame and so supported as to be capable of up-and-down movement relatively thereto, a cam shaft mounted upon the frame, means whereby the drive axle rotates the cam shaft, a rock shaft on the frame, means associated with the rock shaft for imparting a vertical reciprocating motion to the furrow opener, and means associated with the cam shaft arranged to impart rocking motion to the rock shaft.

8. In an implement of the class described, a frame, a drive axle and wheel supported by the frame, a furrow opener connected to the frame in a manner so as to be capable of up-and-down movement relatively thereto, an auxiliary shaft mounted upon the frame and driven by the drive axle, a rock shaft on the frame, means whereby the rock shaft imparts vertical reciprocating motion to the furrow opener, and means associated with the auxiliary shaft arranged to impart rocking motion to the rock shaft when the auxiliary shaft is rotated.

HARRY R. TRAPHAGEN.